US007291379B2

(12) United States Patent
Biagiotti

(10) Patent No.: US 7,291,379 B2
(45) Date of Patent: Nov. 6, 2007

(54) METHOD AND DEVICE FOR PRODUCING AN EMBOSSED WEB MATERIAL AND PRODUCT MADE IN THIS WAY

(75) Inventor: Guglielmo Biagiotti, Lucca (IT)

(73) Assignee: Fabio Perinin S.p.A., Lucca (IT)

(*) Notice: Subject to any disclaimer, the term of this patent is extended or adjusted under 35 U.S.C. 154(b) by 314 days.

(21) Appl. No.: 10/830,082

(22) Filed: Apr. 23, 2004

(65) Prior Publication Data

US 2004/0247836 A1 Dec. 9, 2004

Related U.S. Application Data

(63) Continuation of application No. 09/601,842, filed as application No. PCT/IT99/00051 on Mar. 1, 1999, now Pat. No. 6,755,928.

(30) Foreign Application Priority Data

Mar. 2, 1998 (IT) ............................ FI98A000046
Jun. 10, 1998 (IT) ............................ FI98A000139

(51) Int. Cl.
*B32B 3/00* (2006.01)
*D06N 7/04* (2006.01)
*D21H 11/00* (2006.01)

(52) U.S. Cl. ...................... 428/166; 428/154; 428/172; 162/109; 162/113

(58) Field of Classification Search ................ 428/154, 428/156, 166, 172; 162/109, 113
See application file for complete search history.

(56) References Cited

U.S. PATENT DOCUMENTS 3,414,459 A 12/1968 Wells
3,684,641 A * 8/1972 Murphy ...................... 428/154
3,694,300 A 9/1972 Small
3,961,119 A 6/1976 Thomas
4,307,141 A * 12/1981 Walbrun ..................... 428/132
4,320,162 A * 3/1982 Schulz ....................... 428/154
4,978,565 A 12/1990 Pigneul
5,096,527 A 3/1992 Biagiotti
5,173,351 A 12/1992 Ruppel
5,686,168 A 11/1997 Laurent et al.
5,846,636 A * 12/1998 Ruppel et al. ............. 428/154

FOREIGN PATENT DOCUMENTS

| | | | |
|---|---|---|---|
| EP | 0 408 248 A2 | | 1/1991 |
| EP | 0 408 248 A3 | | 1/1991 |
| FR | 2 684 598 A1 | | 6/1993 |
| GB | 1 225 440 | | 3/1971 |
| WO | WO 95/35205 | * | 12/1995 |
| WO | WO 96/18771 A1 | | 6/1996 |
| WO | WO 97/20687 A1 | | 6/1997 |
| WO | WO 97/20688 A1 | | 6/1997 |
| WO | WO 97/20689 A1 | | 6/1997 |
| WO | WO 97/44528 | * | 11/1997 |

* cited by examiner

*Primary Examiner*—Donald J. Loney
(74) *Attorney, Agent, or Firm*—Breiner & Breiner, LLC

(57) ABSTRACT

For the production of a sheet product including at least two layers (V1, V2) it is suggested, among other things, an embossing device including a first pressure roller (5; 105) interacting with a first and a second embossing cylinder (1, 3; 101, 103) provided with respective points (1P, 3P; 101P, 103P) on their cylindrical surface.

22 Claims, 8 Drawing Sheets

FIG. 1
FIG. 1B
FIG. 1A
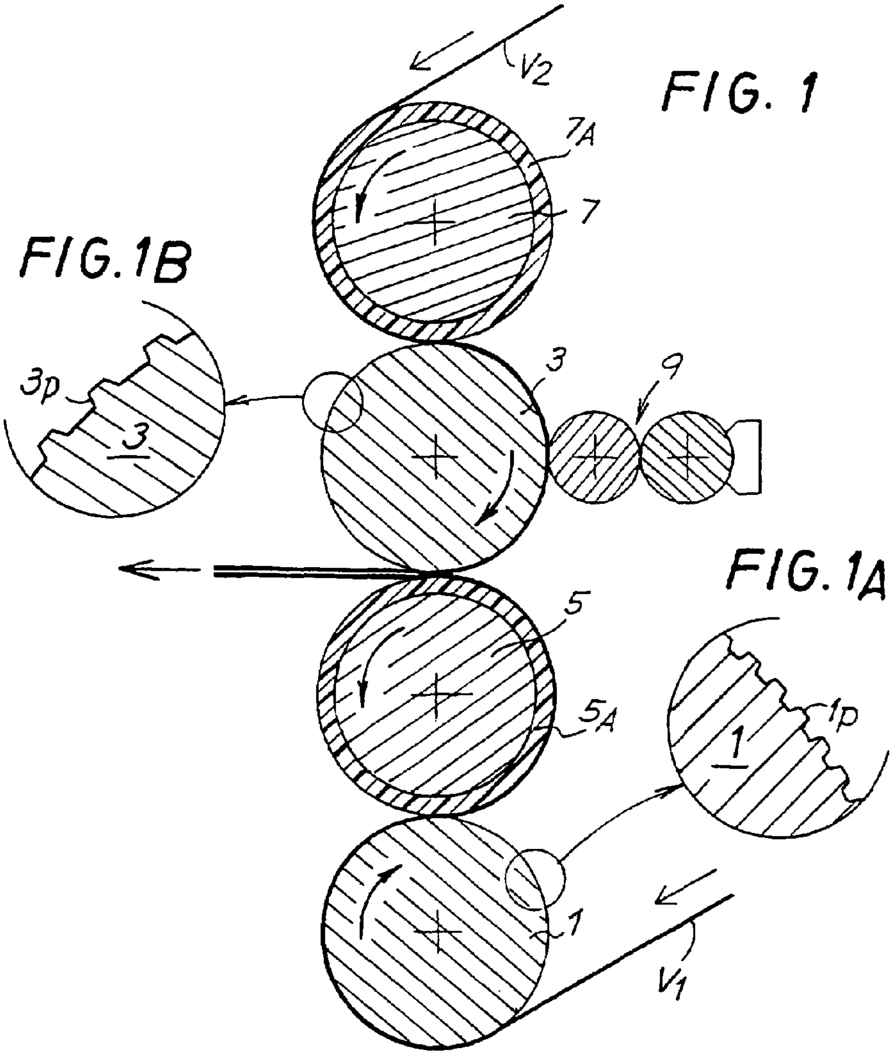
FIG. 2
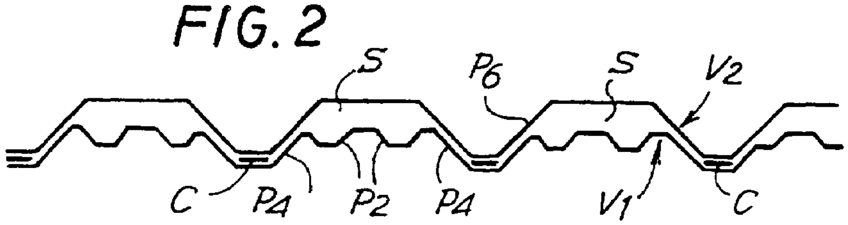

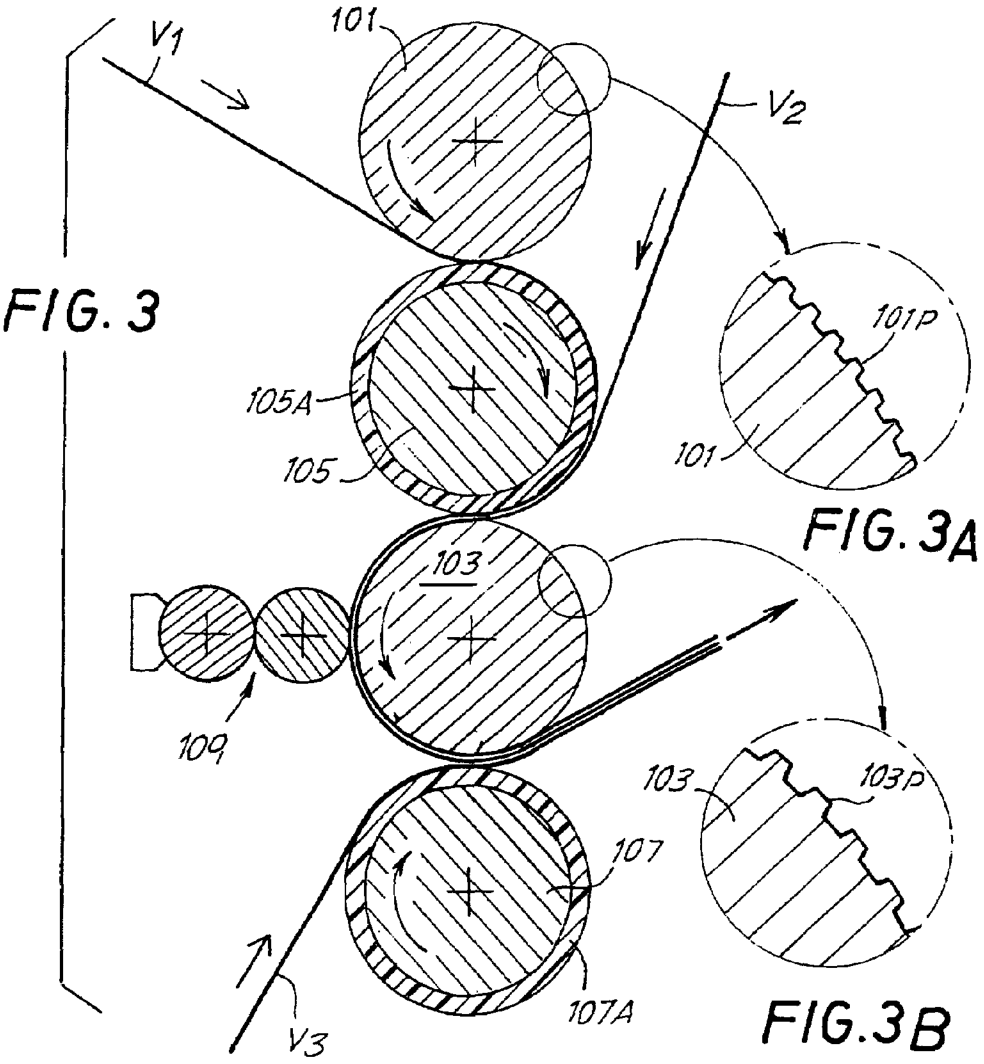
FIG. 3
FIG. 3A
FIG. 3B
FIG. 4
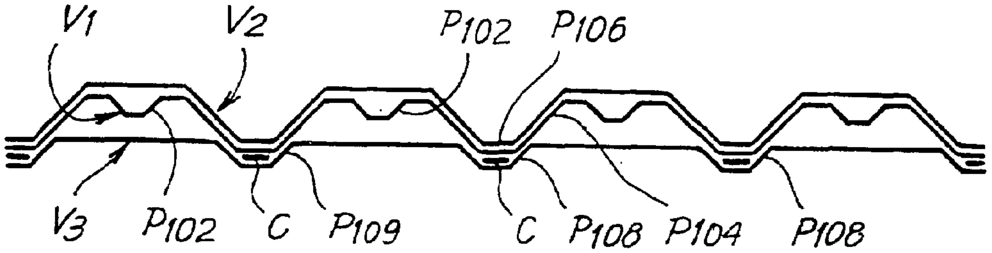

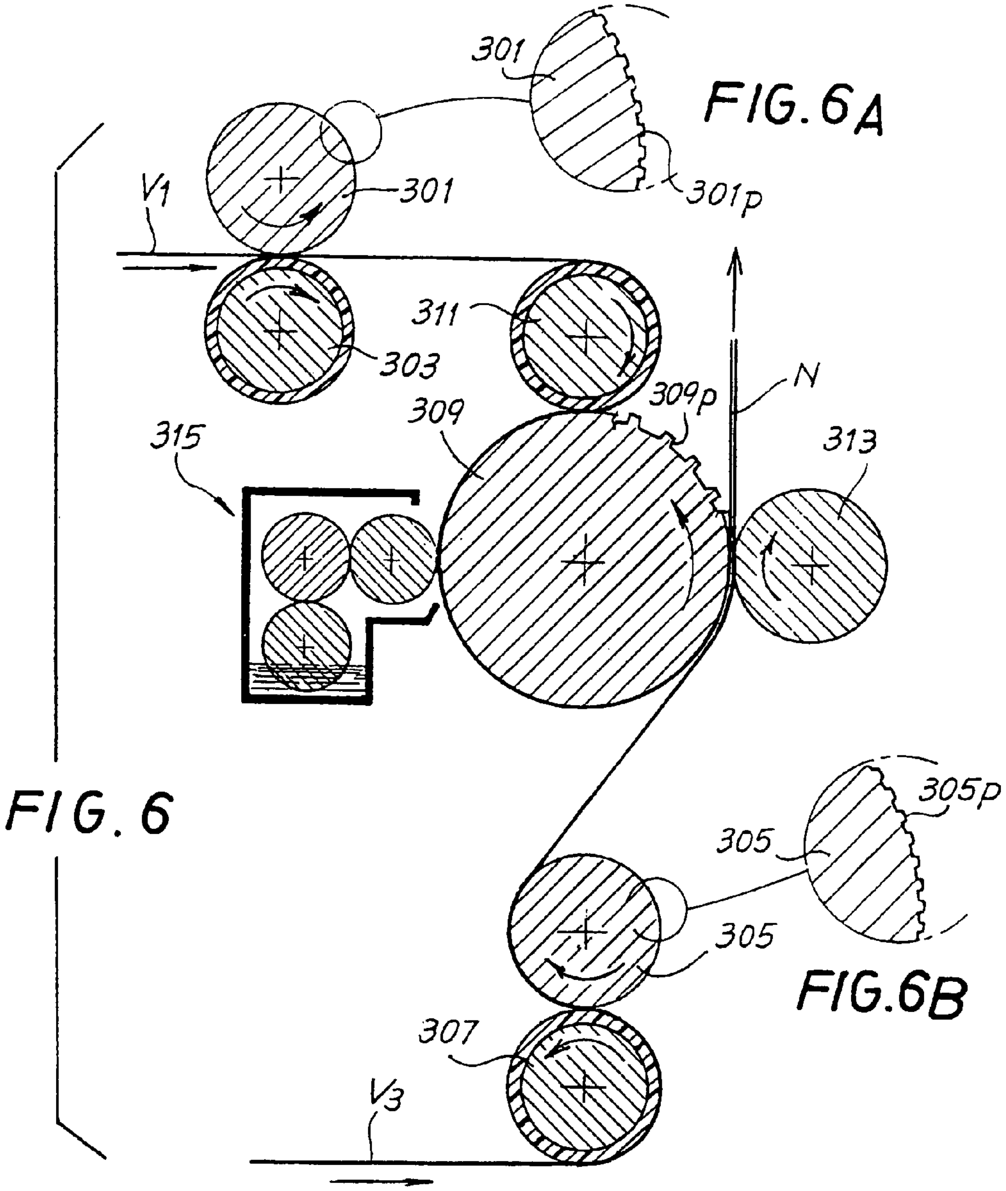
FIG. 7
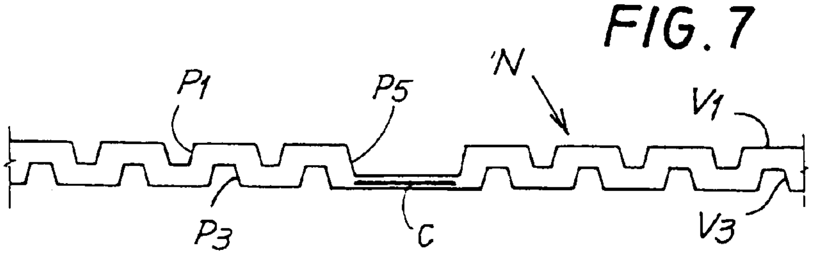

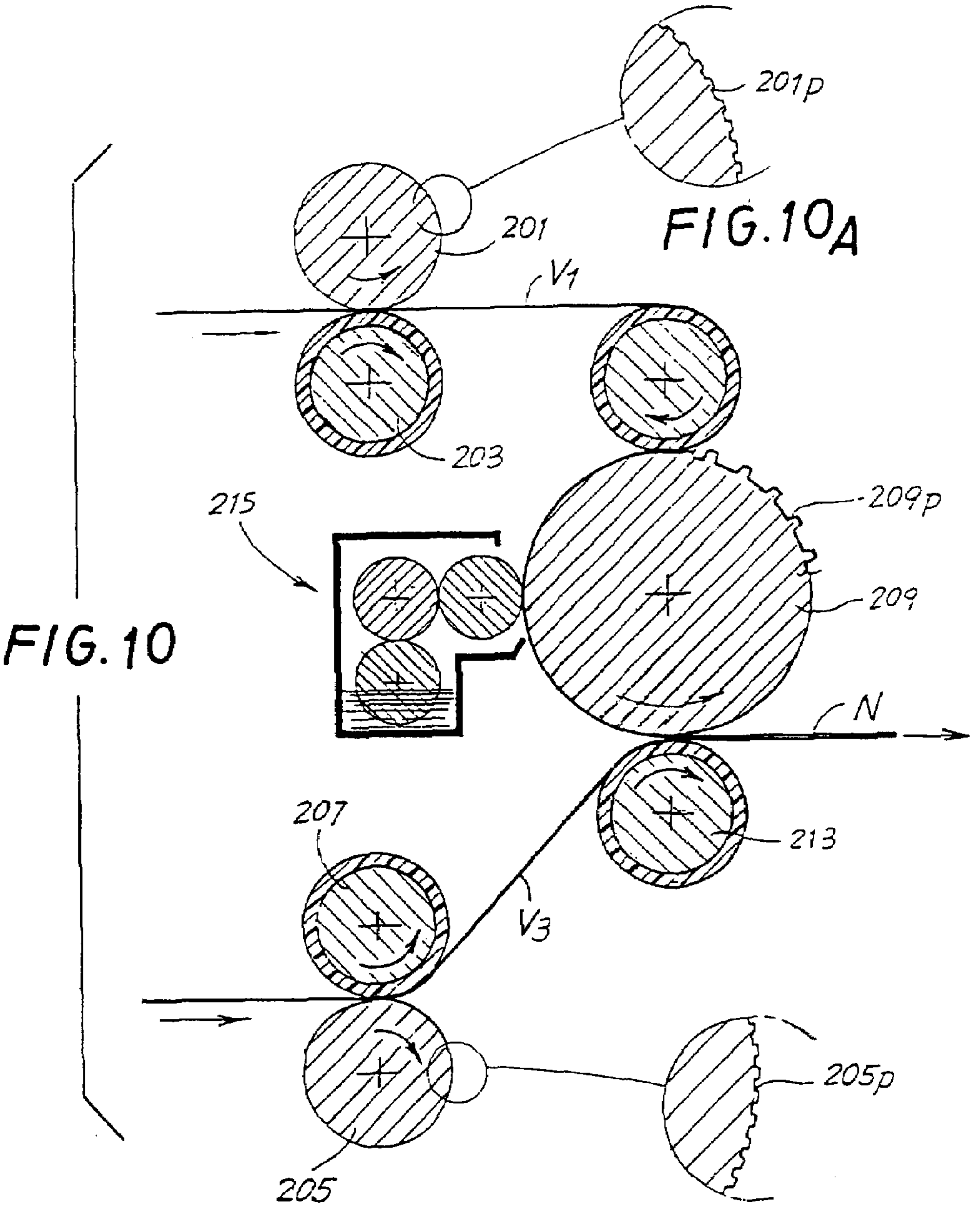
FIG.10A
FIG.10
FIG.10B
FIG.11
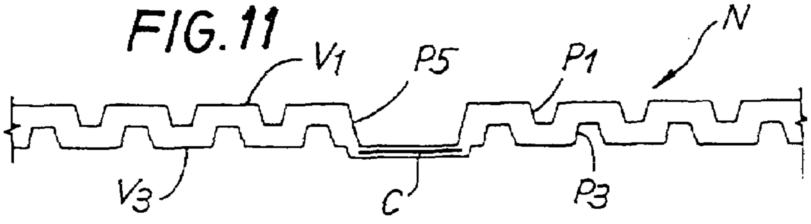

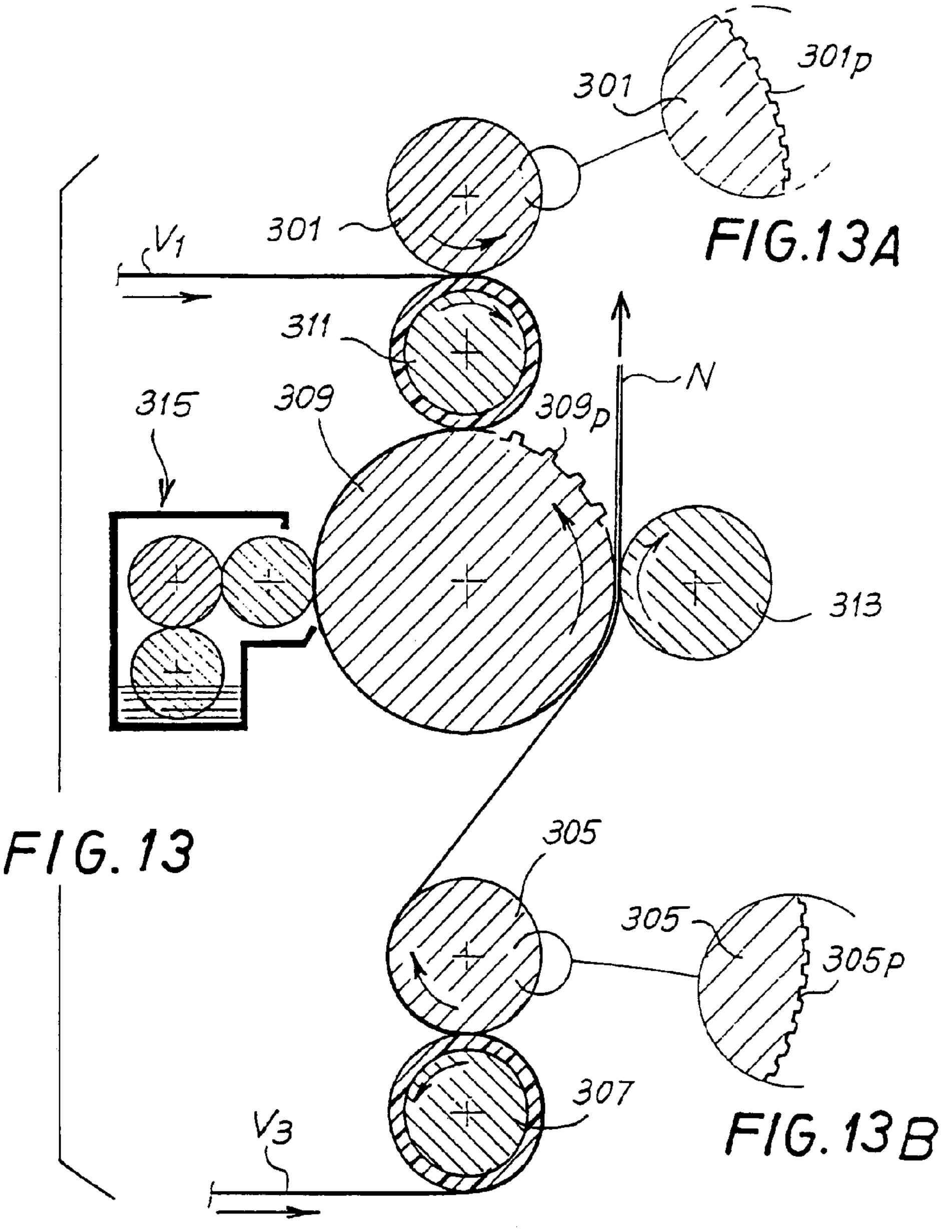
FIG.13A
FIG.13
FIG.13B
FIG.14
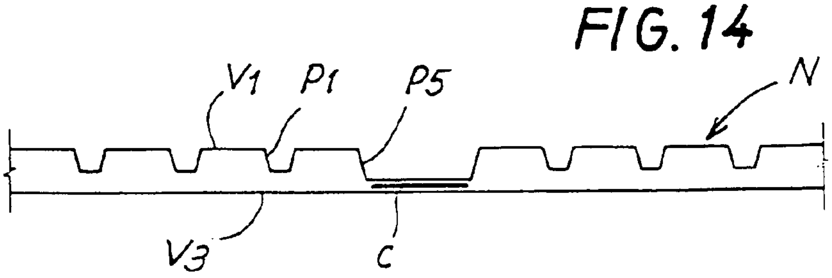

METHOD AND DEVICE FOR PRODUCING AN EMBOSSED WEB MATERIAL AND PRODUCT MADE IN THIS WAY

RELATED APPLICATION

This is a continuation of application Ser. No. 09/601,842 filed Aug. 9, 2000, now U.S. Pat. No. 6,755,928 B1 issued Jun. 29, 2004, which is the U.S. National phase of PCT/IT99/00051 filed Mar. 1, 1999.

TECHNICAL FIELD

The present invention relates to a method and a device for producing embossed sheet material consisting of a plurality of layers, and to a sheet product made in this way.

PRIOR ART

In the manufacture of paper sheet products for domestic use and similar, a process of embossing a paper web material is frequently carried out to produce a greater apparent thickness, good characteristics of liquid absorbency, characteristics of softness to the touch and a decorative effect.

The embossed sheet web material is used for the production of kitchen paper, toilet paper, serviettes, paper tissues, and similar. In general, this web material consists of two or more layers which are usually embossed separately from each other and subsequently joined, usually by means of an adhesive or by other methods, such as ply-bonding. Sheet products having great softness and thickness, and good liquid-absorption characteristics, are produced in this way.

The embossing and the joining of two or more layers normally takes place by two methods, called "tip-to-tip" and "nested" joining. In the first case, two layers of embossed material are joined by lamination between two embossing cylinders with parallel contra-rotating shafts. The two cylinders are provided with points which coincide, at least partially, in a lamination nip formed at the point of tangency between the two cylinders. An adhesive is applied to the protuberances of one of the two embossed layers to provide permanent joining to the other layer at the positions of the protuberances of the other layer in the areas in which the points of the two embossing cylinders coincide with each other. Examples of embossing machines of this type are described in U.S. Pat. No. 3,414,459, U.S. Pat. No. 4,978,565, U.S. Pat. No. 5,173,351, U.S. Pat. No. 5,096,527, U.S. Pat. No. 3,961,119, WO-A-9720687, WO-A-9720688, WO-A-9720689.

In other devices, the layers are joined in such a way that the protuberances of one layer are nested in the cavities between adjacent protuberances of the other layer. In this case, the two embossing cylinders are not pressed against each other at the corresponding points, and the two layers are joined together by lamination by means of a pressure roller which interacts with the surface of one of the embossing cylinders, on which both layers are supported as they emerge from the nip between the embossing cylinders.

Examples of this type of embossing are described and illustrated in GB-A-1,225,440 and U.S. Pat. No. 3,694,300.

Normally, the embossing, whether of the tip-to-tip or the nested type, consists of a geometrical and uniform distribution of protuberances, typically of frusto-conical or frusto-pyramidal shape, on the two layers. To obtain a product with a more attractive appearance, systems in which protuberances of dissimilar shapes are combined with each other to obtain a particular design have been devised. For example, U.S. Pat. No. 4,320,162 describes an embossing system in which embossing consisting of a geometrical and uniform distribution of small protuberances arranged with a high density, forming a fine background embossing, combined with a distribution at low density of protuberances of complex shape and of larger size, forming a decorative motif, is produced on each of the two layers. A similar product is described in WO-A-9618771.

A disadvantage of this system consists in the fact that when it is desired to change the decorative motif it is necessary to make a new pair of embossing cylinders, or at least one new embossing cylinder, and this requires the new production not only of the whole of the decorative motif but also of all the points of the cylinder which produce the background embossing.

OBJECTS OF THE INVENTION

The object of the present invention is to provide a method and a device for producing an embossed product of the type comprising a first embossing and a second more widely spaced embossing consisting of decorative motifs, in a similar way to that described in U.S. Pat. No. 4,320,162, which provides a high quality.

A further object of the present invention is to provide an embossing device and method which enable the decorative motifs to be modified in an economical way.

Yet another object of the present invention is to provide a method and a device which enable a soft product to be produced with the possibility of increasing the decorative effect of the embossing by combining it with the use of colored adhesives.

It is also an object of the invention to provide an embossing device which can be produced in an economical way by the conversion of existing embossing systems.

SUMMARY OF THE INVENTION

These and further objects and advantages, which will be evident to persons skilled in the art from a reading of the following text, are achieved according to the invention by means of a process comprising the stages of:

embossing a first layer of web material previously furnished with a background pattern made up of a first set of protuberances, so as to generate on it a second set of protuberances which are partially superimposed on the first set of protuberances and of larger dimensions and lower density than the protuberances of said first set of protuberances;

to couple, preferably by means of gluing, a second layer to the so embossed first layer.

The second layer may be smooth, embossed with a background pattern, embossed with an ornamental motif or embossed both with a background pattern and an ornamental motif.

In an especially advantageous embodiment of the invention, the protuberances of the second and third sets of protuberances, arranged on the first and second layers respectively, are generated by the same embossing cylinder with which two pressure rollers interact, so that they exhibit the same density and the same arrangement and lie inside one another. In this way it is also possible to unite the two layers by the application of an adhesive to the protuberances of the third set of protuberances present on the second layer, and then to laminate the first and second layers in the course of generating the second set of protuberances. The adhesive may be applied to all protuberances of the third set or only to some of these, as is known per se.

In a practical embodiment of the method according to the invention the first and second sets of protuberances can be generated on the first layer of web material by running the latter around a first pressure roller which interacts with a first and a second embossing cylinders. The two embossing cylinders comprise respectively first and second sets of points, the second set of points being of larger dimensions and lower density than the first set of points.

The second embossing cylinder may interact with a second pressure roller to generate the third set of protuberances on the second layer.

The embossing on two layers may be such as to generate the protuberances of the first and third sets with approximately equal depth, that is to say height. Alternatively the height of the protuberances of the third set may be made greater than the height of the protuberances of the second set. In this way, joining the two layers generates hollow spaces which enhance the softness and absorption capacity of the web material.

In another embodiment of the method according to the invention, the second layer may be run around the first pressure roller with which the first and second embossing cylinders interact. Contact between the second layer and the first pressure roller occurs downstream of the area in which the first layer is embossed, between the first embossing cylinder and the first pressure roller. By this means the second layer is embossed on the first layer between the first pressure roller and the second embossing cylinder which interacts with the first pressure roller.

Another possibility involves arranging a second pressure roller around the second embossing cylinder and feeding a third layer of web material around the second pressure roller, between the latter and the second embossing cylinder. The third layer of web material is then embossed by the generation upon it of a fourth set of protuberances; the first, second and third layers are then laminated together between the second embossing cylinder and the second pressure roller. The layers can be united with an adhesive which is applied to at least some of the protuberances of the second set of protuberances produced on the first layer. The gluing of the three layers occurs by the migration of the adhesive through the second layer toward the first layer.

One advantageous embodiment of a device for carrying out the method according to the invention involves using a pressure roller interacting with a first and a second embossing cylinders carrying respective points on their cylindrical surfaces. The two embossing cylinders preferably have points with dissimilar densities, and in particular with larger dimensions and lower density on one and lower density and larger dimensions on the other.

According to a different form of embodiment of the invention, there is provided a process comprising the stages of

- carrying out a first embossing on the two layers separately, according to a background pattern formed by a first set of protuberances;
- re-embossing at least one of the two layers with an ornamental motif having larger dimensions and a lower density than those of said background pattern, formed by a second set of protuberances which are partially superimposed on protuberances of the first set of protuberances of said background pattern; and
- joining said two layers.

In practice, the protuberances of the background pattern and the protuberances of the ornamental motif may be made to project on the same face of the corresponding layer, particularly that which, in the final joined product, faces the interior of the product.

In a preferred embodiment of the invention, the protuberances of the second set, forming the ornamental motif, have a greater height than that of the protuberances of the first set which form the background pattern, and the two layers are joined together by gluing at the positions of the protuberances of the second set.

To obtain a particular appearance, it is possible, according to a possible embodiment of the process, to arrange for the layers to be joined together by means of a colored adhesive, so that the ornamental motif stands out from the background of the web material.

The device for producing a web material with at least two embossed and joined layers comprises, according to the invention,

- a first embossing unit for a first layer and a first embossing unit for a second layer, said first embossing units generating in said first and said second layers a background pattern consisting of a first set of protuberances;
- a second embossing unit for generating, in the first layer, an ornamental motif consisting of a second set of protuberances having a density lower than that of the first set of protuberances, which are partially superimposed on said background pattern; and
- joining and laminating members for joining together said first and said second layers.

Advantageously, an adhesive dispenser associated with said second embossing unit is provided, to apply an adhesive to at least some of the protuberances of said first layer, and then to carry out the joining together of the two layers by gluing and lamination.

In a particularly advantageous embodiment of the device, the joining and laminating members join the two layers at the positions of the protuberances of the ornamental motif, which for this purpose have a greater height than the protuberances of the background pattern.

In a possible embodiment of the device, each of the first two embossing units for the first and the second layers comprises a pair of embossing rollers, one of which is provided with points while the other is provided with a yielding surface; alternatively, each (or at least one) comprises a pair of rollers made from steel or other hard material.

The joining and laminating members consist, for example, of an embossing cylinder of the second embossing unit and a marrying roller, said embossing cylinder being provided with points for generating the second set of protuberances forming the ornamental motif.

In a different embodiment of the device according to the present invention, the first embossing unit for the first layer comprises a pair of embossing rollers; the second embossing unit comprises an embossing cylinder, provided with points for generating the second set of protuberances forming said ornamental motif, and interacting with a pressure roller; and the first embossing unit for the second layer comprises a further embossing cylinder provided with points and interacting with a pressure roller having a yielding surface. In this case, the joining and laminating members may consist of the embossing cylinder of the second embossing unit for the first layer and of said further embossing cylinder for the second layer, which form between them a lamination area in which the points of the two embossing cylinders interact to join the two embossed layers.

The invention also relates to a sheet material formed by at least two embossed and joined layers, characterized in that the first of said layers comprises a background embossing consisting of a first set of protuberances and a second embossing formed by a second set of protuberances forming an ornamental motif, the protuberances of said second set having larger dimensions and a lower density than said first set of protuberances, the protuberances of the second set being superimposed on the protuberances of the first set; and in that said second layer comprises at least one background embossing consisting of a set of protuberances.

Further advantageous characteristics and embodiments of the method, the device and the product according to the invention are described below and indicated in the attached dependent claims.

BRIEF DESCRIPTION OF THE DRAWINGS

A clearer understanding of the invention will be gained by examining the description and the attached drawings which show practical illustrative embodiments of the invention. More particularly:

FIG. 1 shows a diagram of a device for implementing the method according to the invention in a first embodiment;

FIGS. 1A and 1B show enlarged details from FIG. 1;

FIG. 2 shows a highly enlarged diagrammatic cross section of the product produced by the device shown in FIG. 1;

FIG. 3 shows diagrammatically a device for implementing the method according to the invention in another embodiment;

FIGS. 3A and 3B show enlarged details of FIG. 3;

FIG. 4 shows a highly enlarged diagrammatic cross section of the product produced by the device shown in FIG. 3;

FIG. 6 shows a diagram of a further embodiment of the embossing device according to the invention;

FIGS. 6A and 6B show enlargements of details of FIG. 6;

FIG. 7 shows an enlarged section through a product which can be made with the device in FIG. 6;

FIG. 8A shows an enlargement of a detail of FIG. 8;

FIG. 10 shows a diagram of a further embodiment of the device according to the invention;

FIGS. 10A and 10B show enlargements of details of FIG. 10;

FIG. 11 shows an enlarged section through a product which can be made with the device in FIG. 10;

FIG. 13 shows a diagram of a further embodiment of the invention;

FIGS. 13A and 13B show enlarged details of FIG. 13; and

FIG. 14 shows an enlarged section through a sheet product having an embossed layer and a smooth layer joined to it.

DETAILED DESCRIPTION OF THE PREFERRED EMBODIMENTS OF THE INVENTION

Figure 5:
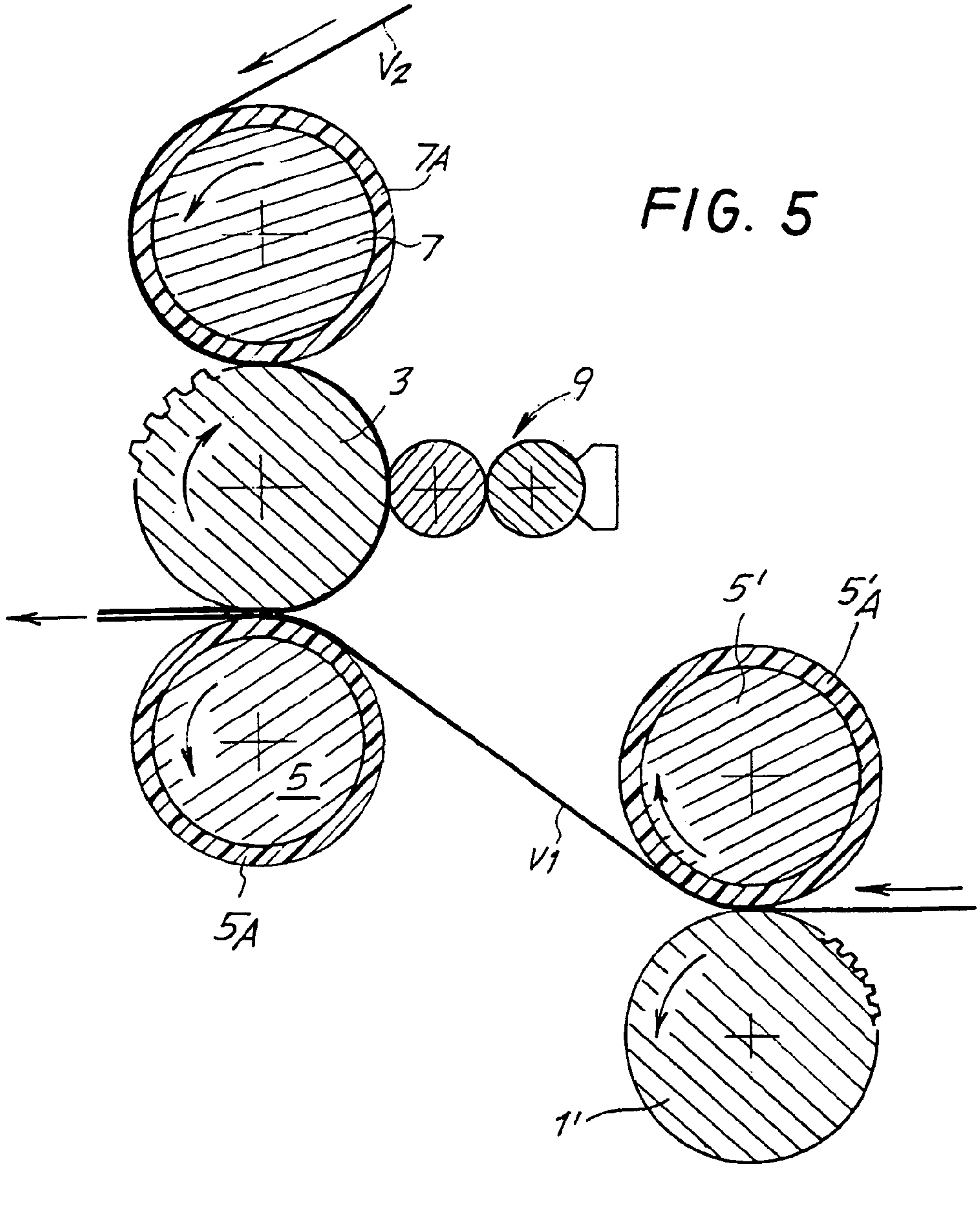
FIG. 5 shows a diagram of a device for implementing the method according to the invention, in another embodiment.

Shown in FIGS. 1, 1A, 1B and 2 is a first embodiment of the invention. The device here comprises a first embossing cylinder 1 and a second embossing cylinder 3. The two embossing cylinders 1 and 3 have respective points marked 1P and 3P in the enlarged diagrammatic illustrations shown in FIGS. 1A and 1B, respectively. The points 1P have smaller dimensions and greater density than the points 3P.

Interacting with the two embossing cylinders 1 and 3 is a first pressure roller 5 covered with a covering 5A of yielding material, e.g. rubber. Also interacting with the second embossing cylinder 3 is a second pressure roller 7 which is likewise covered with yielding material 7A. The embossing cylinder 3 is also provided with a dispenser of adhesive to which the general reference 9 is given. This is of a type known per se and is not described in greater detail.

The embossing cylinders 1 and 3 and the pressure rollers 5 and 7 are arranged (in the example illustrated) in such a way that their respective axes are aligned in a vertical plane, although this is not obligatory.

The operation of the device described thus far is as follows. A first layer of web material, for example a layer of tissue paper, marked V1, is fed to the first embossing cylinder 1, around it and on to the first pressure roller 5. Between the embossing cylinder 1 and the pressure roller 5 the layer 1 is squeezed and embossed on the points 1P of the embossing cylinder 1. Similarly a second layer V2 of paper material is fed around the second pressure roller 7 and embossed between the second pressure roller 7 and the second embossing cylinder 3.

The first layer V1 is then run around the first pressure roller 5 to the nip between the latter and the second embossing cylinder 3, where the layer V1 is laid on top of the layer V2 fed to the lamination nip between the first pressure roller 5 and the second embossing cylinder 3. Consequently the first layer V1 is re-embossed between the first pressure roller 5 and the second embossing cylinder 3, thereby receiving an embossed pattern by the action of the points 3P, with a lower density and a larger dimension than that of the background pattern generated on the same layer V1 by the points 1P of the first embossing cylinder 1. An adhesive C having been applied to the protuberances generated on the layer V2 by the second embossing cylinder 3 before the layers V1 and V2 are joined, in the lamination nip between the second embossing cylinder 3 and the first pressure roller 5, the two layers also become stuck to each other. The adhesive may be dispensed by the dispenser 9 on only some or on all of the protuberances generated on the second layer V2 by the second embossing cylinder 3.

The resulting product is shown diagrammatically in FIG. 2 where V1 and V2 again denote the first and second layers, respectively. The layer V1 comprises a first set of protuberances P2 of smaller dimensions and greater density, defining a background pattern, and a second set of protuberances marked P4, of greater dimensions and lower density. The protuberances P2 are generated by the points 1P of the first embossing cylinder 1, while the protuberances P4 are generated by the second embossing cylinder 3. Both sets of protuberances are produced by the pressure of the pressure roller 5 against the respective embossing cylinders 1 and 3. As can be seen in the diagram, FIG. 2, at the protuberances P4 the protuberances P2 which originally covered the entire surface of the layer V1 have been squeezed and largely removed. The second layer V2 comprises a third series of protuberances P6 generated by the second embossing cylinder 3 and therefore positioned with the same arrangement as the protuberances P4 on the layer V1. The protuberances P6 of the third set lie inside the protuberances P4 of the second set and are glued to the latter by the adhesive C applied by the dispenser 9.

As can be seen in the diagram, FIG. 2, the depth to which the protuberances P6 are embossed is greater than the depth to which the protuberances P4 are embossed. This can be done by using a covering 5A for the first pressure roller 5 that is not as yielding as the covering 7A of the second pressure roller 7 and/or different pressures. In this way, by joining together the layers V1 and V2, hollow spaces S are left between the two layers in the cavities between adjacent protuberances P6 and P4.

FIGS. 3, 3A, 3B and 4 illustrate a different embodiment of the invention. Here, the device (illustrated in FIGS. 3, 3A and 3B) again has a first embossing cylinder marked 101, a second embossing cylinder marked 103, a first pressure roller marked 105 and fitted with a yielding covering 105A, and a second pressure roller 107 fitted with a yielding covering 107A.

Once again the axes of the two cylinders 101 and 103 and of the two rollers 105 and 107 are in vertical alignment. The embossing cylinder 101 interacts with the pressure roller 105, while the latter interacts in turn with the embossing cylinder 103, which also interacts with the pressure roller 107. The embossing cylinder 103 is provided with a dispenser of adhesive 109.

As shown in the enlarged detail, FIG. 3A, the first embossing cylinder 101 carries protuberances 101P, while (see FIG. 3B) the second embossing cylinder 103 carries points 103P of larger dimensions and lower density than the points 101P of the first embossing cylinder 101.

The device described thus far operates as follows. A first layer V1 of web material is fed between the first embossing cylinder 101 and the first pressure roller 105, causing it to be embossed with a first set of protuberances having high density and small dimensions which form a background pattern. The first layer V1, now embossed, is run around the first pressure roller 105 and a second layer V2 is laid against it. The two layers V1 (which is already embossed) and V2 (which is still smooth) are then fed into the nip between the second embossing cylinder 103 and the first pressure roller 105. In this way the two layers V1 and V2 receive an additional embossing defined by a second set of protuberances (on the layer V1) and by a third set of protuberances (on the layer V2) of larger dimensions and lower density than the protuberances previously formed on the layer V1. The protuberances of the second and third sets are generated by the points 103P of the second embossing cylinder 103.

On the more projecting surface of the protuberances of the second set, generated on the outer layer V1, an adhesive is applied by the dispenser 109, while the two layers V1 and V2 are run around the second embossing cylinder 103. A third layer V3 is fed into the nip between the second embossing cylinder 103 and the second pressure roller 107 and is joined to the layers V1 and V2, the three layers being laminated together in the nip between the second cylinder 103 and the second pressure roller 107.

In the lamination nip between the second embossing cylinder 103 and the second pressure roller 107 the three layers are laminated together so that the adhesive C migrates through the thickness of the layer V1 toward the layer V2. The result of this is that all three layers V1, V2 and V3 are glued together forming the embossed sheet product.

The product obtained is illustrated diagrammatically in the enlarged and diagrammatic cross section, FIG. 4, where the layers are again marked V1, V2 and V3. P102 denotes the protuberances of the first set of protuberances generated by the first embossing cylinder 101 and by the first pressure roller 105 on the layer V1. P106 denotes the protuberances of the third set of protuberances generated on the second layer V2 by the first pressure roller 105 and second embossing cylinder 103. P104 denotes the protuberances of the second set of protuberances generated on the layer V1 by the first pressure roller 105 and second embossing cylinder 103. Lastly, P108 denotes the protuberances of the fourth set of protuberances generated by the second pressure roller 107 and second embossing cylinder 103 on the layer V3. The letter C denotes the adhesive applied by the adhesive dispenser 109 to the outer surface of the protuberances P104 of the layer V1.

FIG. 5 diagrammatically shows another embodiment of a device for implementing the method according to the present invention. This embodiment is a modification of the device seen in FIG. 1, and parts identical or corresponding to those of the device seen in FIG. 1 are given the same reference number.

The device shown in FIG. 5 differs from that of FIG. 1 in that the first pressure roller 5 interacts only with the second embossing cylinder 3 and not with the first embossing cylinder 1. The first embossing on the layer V1 is in this case produced by a first embossing cylinder 1' interacting with another pressure roller 5'. As a consequence of this, the protuberances P2 that are generated on the layer extend toward the middle of the web material, thus making for greater softness and less roughness of the final material compared with that produced by the device seen in FIG. 1.

With reference to FIGS. 6 and 7, a first embodiment of the invention will be described. The device comprises a first embossing unit for a first layer V1, consisting of a pair of embossing rollers 301, 303, the first of which is a steel cylinder provided with a plurality of points 301P (see the detail in FIG. 6A). The second roller 303 is a roller covered with yielding elastic material, for example rubber.

The device also comprises a further embossing unit for a second layer V3, consisting of a pair of embossing rollers 305, 307, the first of which is a steel roller provided with points 305P similar to the points 301P of the roller 301, while the second is a roller covered with a yielding material.

Alternatively, one or both of the embossing units 301, 303 and 305, 307 may comprise two steel rollers, provided with points and depressions, in a known way.

The points of the rollers 301 and 305 are of simple geometric shape, for example frusto-conical or frusto-pyramidal, and are arranged with a density ranging from 10 to 100 points per $cm^2$. They produce an embossing forming a background pattern on the layers V1 and V3 of web material which are made to pass through the pairs of rollers 301, 303 and 305, 307.

The device also comprises a second embossing unit for the first layer V1, consisting of an embossing cylinder 309 provided with a plurality of points 309P having larger sizes and more complex shapes than those of the points of the rollers 301 and 307, which form a second set of protuberances forming an ornamental motif on the layer V1. The embossing cylinder 309 interacts with a pressure roller 311 covered with a yielding material, for example rubber, and a marrying roller 313 which may be made from a hard material, for example steel, or a moderately yielding material, for example hard rubber, or an elastically yielding material like that of the roller 303. An adhesive applicator 315, of a known type, is also provided.

The operation of the described device is as follows. The two layers V1 and V3 are fed respectively to the first embossing unit 301, 303 and to the further embossing unit 305, 307, and undergoes a first background embossing, carried out by the points 301P of the roller 301 and by the equivalent points 305P of the roller 305 (see the detail in FIG. 6B), which generate a first set of protuberances P1 and P3 on each layer (see FIG. 7). After the pair of rollers 301, 303, the layer V1 is fed to the second embossing unit 309, 311 and for this purpose is run around the pressure roller 311 and then around the embossing cylinder 309. The pressure with which the pressure roller 311 presses against the surface of the embossing cylinder 309 causes a second embossing of the layer V1, with a motif having a lower density and consisting of the points 309P, which have a greater height than the points 301P and 305P. This prevents damage to the embossing between the points 309P generated in the layer V1 by the rollers 301 and 303.

The layer V3 embossed by the corresponding first embossing unit 305, 307 is run around the embossing cylinder 309, where it is placed on the layer V1 which has previously been provided with adhesive by the gluing device 315 on the furthest projecting surface of the layer, in other words on the outer surfaces of the points 309P.

The two layers V1 and V3 bearing on the surface of the embossing cylinder 309 are then laminated between the embossing cylinder 309 and the marrying roller 313 in such a way as to cause them to adhere to each other and to produce the final web material N. In the lamination area, the embossing of the layer V3 where it meets the points 309P of the embossing cylinder 309 is practically removed by the squeezing action. The layer V3 is thus substantially flat at the positions of the protuberances P5.

The result of the process described above is represented schematically in FIG. 7, which shows a greatly enlarged section through the web material N, orthogonal to the surface of the material. P1 and P3 indicate the protuberances of a first set formed in the layers V1 and V3 by the corresponding first embossing units 301, 303 and 305, 307 respectively. P5 indicates a protuberance of the second set of protuberances generated in the layer V1 by the points 309P of the embossing cylinder 309 of the second embossing unit 309, 311. The layer V3 is squeezed where it meets this protuberance P5 and the protuberances P3 are substantially removed or at least greatly reduced. The two layers V1 and V3 are glued together at the positions of the protuberances P5, which project further than the protuberances P1, to which the adhesive is not dispensed by the dispenser 315.

In the case in which the roller 313 is covered with a more yielding material, the resulting product has the appearance shown in FIG. 11, with the layer V3 deformed outward at the positions of the protuberances P5.

Figure 12:
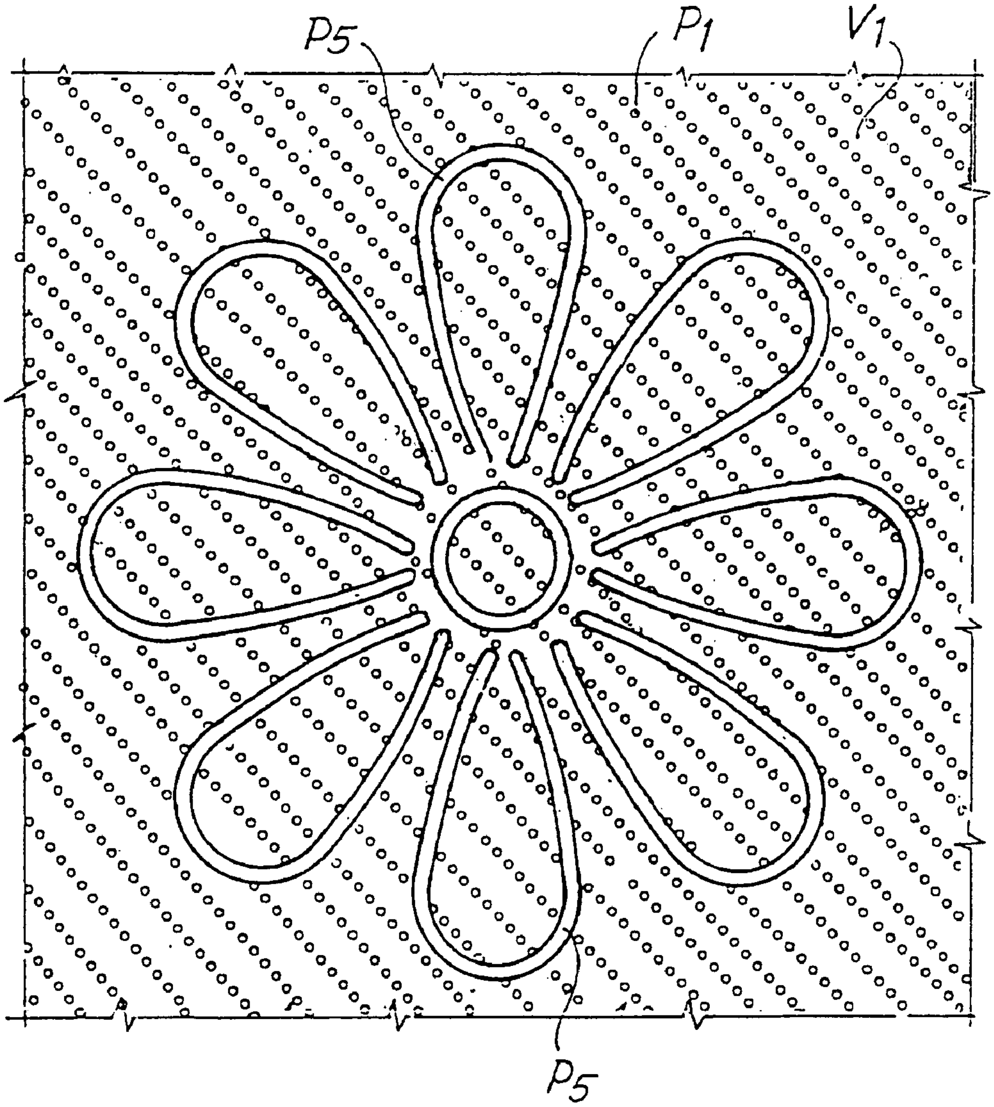
FIG. 12 shows a front view of a portion of web material produced by the method and device according to the present invention.

FIG. 12 shows a plan view of a portion of web material produced by the described process, seen from the side of the layer V1. The larger protuberances indicated by P5 form a decorative design (a flower design in the illustrated example), while the protuberances P1 form a dotted background.

Figure 8:
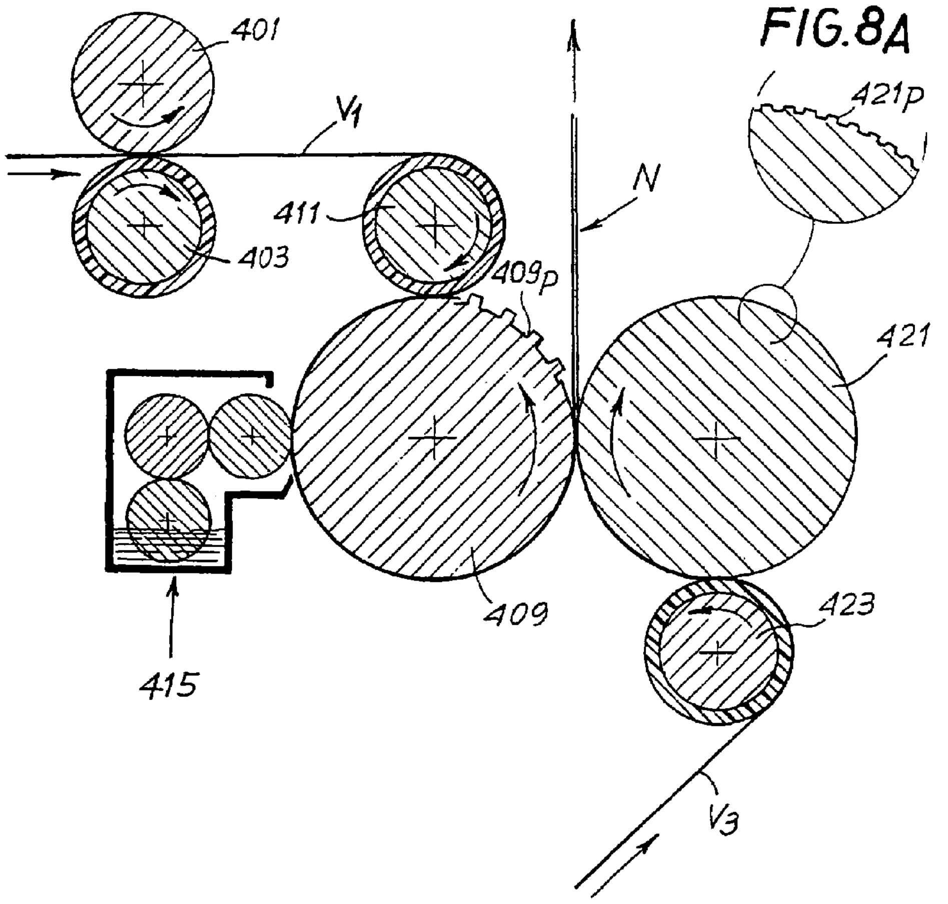
FIG. 8 shows a diagram of a further embodiment of the device according to the invention.

FIG. 8 shows a further embodiment of the device according to the invention. In this embodiment, a first embossing unit for the layer V1 is provided, and consists of a pair of embossing rollers 401, 403, equivalent to the first embossing unit 301, 303. The roller 401 is made from a hard material, for example steel, and has a plurality of points similar to the points 301P, while the roller 403 is covered with yielding rubber. In this case also, there is no reason why rollers 401, 403 both made from steel should not be used.

After the pair of rollers 401, 403 there is a second embossing unit for the first layer V1, comprising an embossing cylinder 409, equivalent to the embossing cylinder 309 in FIG. 6, interacting with a first pressure roller 411 covered with yielding material. The embossing cylinder 409 interacts with a further embossing cylinder 421 which forms, with the embossing cylinder 409, a lamination nip. The further embossing cylinder 421 has a plurality of points 421P whose dimensions and density substantially correspond to those of the embossing roller 401 (see the enlargement in FIG. 8A).

The further embossing cylinder 421 interacts with a second pressure roller 423 covered with yielding material, for example rubber, in a similar way to the pressure roller 411. The embossing cylinder 421 and the pressure roller 423 form the first embossing unit for the second layer V3.

The number 415 indicates a gluing device similar to the gluing device 315 in FIG. 6, interacting with the embossing cylinder 409.

The first layer V1 of web material is made to pass between the rollers 401, 403 of the first embossing unit, to undergo a first background embossing with a first set of protuberances with a density of the order of 10-100 points per $cm^2$. The layer V1 embossed in this way is made to pass into the second embossing unit, consisting of the pressure roller 411 and the embossing cylinder 409 which has a plurality of points 409P equivalent to the points 309P of the embossing cylinder 309 in FIG. 6. The second embossing unit 409, 411 generates in the layer V1 a second set of protuberances forming the ornamental motif.

The second layer V3 is made to pass through the further embossing unit for the second layer, consisting of the embossing cylinder 421 and the pressure roller 423, and is embossed here by the points 421P to form on it a set of protuberances forming the background pattern.

Figure 9:
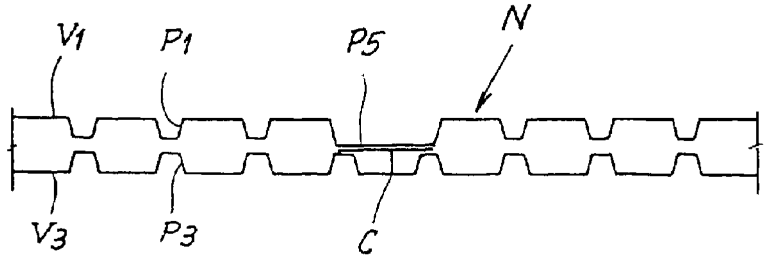
FIG. 9 shows an enlarged section through a product which can be made with the device in FIG. 8.

In the lamination nip between the two embossing cylinders 409, 421 the two layers V1, V3 are joined together by the action of the lamination carried out by the pressure of the points 421P of the embossing cylinder 421 on the points 409P of the embossing cylinder 409. The product which is thus obtained is illustrated schematically in the section in FIG. 9, where P1 and P3 indicate, respectively, the protuberances of the first set of protuberances generated by the first embossing unit 401, 403 for the first layer V1, and the protuberances of the first set of protuberances generated by the embossing unit 421, 423 in the second layer. P5 indicates one of the larger protuberances of the second set of protuberances forming the ornamental motif which is generated by the second embossing unit 409, 411 for the first layer. The appearance of the product when looking towards the layer V1 is again that shown in FIG. 12.

FIG. 10 shows schematically still a further embodiment of the device according to the invention. In this case, the numbers 201 and 203 indicate the first embossing unit for the first layer V1, comprising a pair of embossing rollers, where the roller 201 is made from steel or other hard material and is provided with points 201P (see the enlargement in FIG. 10A), while the roller 203 is covered with elastically yielding material. The numbers 205 and 207 indicate a pair of embossing rollers equivalent to the rollers 305, 307 in FIG. 6, the roller 205 being made from steel or other hard material and provided with points 205P (see the enlargement in FIG. 6B), while the roller 207 is covered with elastically yielding material. The rollers 205, 207 form the further embossing unit for the second layer. In this case also, the first two embossing units 201, 203 and 205, 207 may consist of pairs of rollers made from hard material and provided with corresponding points.

A second embossing unit for the first layer V1, comprising an embossing cylinder 209 provided with points 209P similar to the points 409P and 309P, is located after the embossing units 201, 203 and 205, 207 for the first and second layers V1, V3. The embossing cylinder 209 interacts with a first and a second pressure rollers 211, 213 covered with elastically yielding material.

The first layer V1 is embossed by the corresponding embossing unit 201, 203 and is provided with a first set of protuberances P1 forming the background pattern, while the second layer V3 is embossed in a similar way by the corresponding embossing unit 205, 207 and is provided with a corresponding first set of protuberances P3 forming the background pattern.

The layer V1 embossed in this way is passed through the second embossing unit consisting of the pressure roller 211 and the embossing roller 209, whose points 209P generate the second set of protuberances P5 having greater heights and extensions than the protuberances P1 of the first set, and having a lower density. The points 209P substantially eliminate the protuberances P1 in the area of superimposition, by the squeezing action.

The layer V3 is then joined to the layer V1 in the lamination nip between the embossing cylinder 209 and the pressure roller 213, where the two layers are glued to each other by means of the adhesive applied by the dispenser 215 to the portions of the surface of the layer V1 bearing on the points 209P.

The resulting product is shown schematically in the enlarged section in FIG. 11. By contrast with the product in FIG. 7, that in FIG. 11 shows an embossing of the layer V3 at the positions of the protuberances P5 and therefore of the points 209P of the cylinder 209, owing to the yielding nature of the covering of the pressure roller 213. The appearance of the product when looking toward the layer V1 is again similar to that in FIG. 12. If the pressure roller 213 has a harder surface, made for example from steel or hard rubber, the resulting product will have the appearance shown in FIG. 7.

FIG. 13 shows a variant of the diagram in FIG. 6, in which identical or corresponding parts are indicated by the same reference numbers. In this embodiment, the embossing roller 303 has been dispensed with, and the embossing roller 301 interacts with the pressure roller 311. The axes of the rollers 301, 311 and of the embossing cylinder 309 are thus aligned in a vertical plane. In this configuration, one roller is dispensed with. The configuration shown in FIGS. 8 and 10 may be modified in a similar way.

As is clearly shown by the preceding description, the ornamental motif formed by the second set of protuberances P5 is generated, in all cases, by a cylinder different from that which generates the first set of protuberances P1 of the background pattern. Consequently, when the ornamental motif is to be replaced, in order to customize the product for example, or to meet particular market requirements, it is not necessary to construct a new complex cylinder having the points which generate the background pattern and also the points which generate the ornamental motif. Instead, it is sufficient to change the embossing cylinder (309, 409; 209) which generates the second set of protuberances P5, while the rollers which generate the background patterns on the two layers remain the same. In an even more advantageous way, the points 309P, 409P, 209P may be formed by replaceable inserts which can be applied in a removable way to a cylinder which does not have to be replaced. Alternatively, the cylinder 309, 409, 209 may have a replaceable outer cylindrical sleeve on which the corresponding points are applied. In this way, it is only necessary to replace the outer sleeve to change the ornamental motif formed by the second set of protuberances P5 in the web material.

FIG. 14 shows an enlargement of a section through a web material which can be produced with one of the illustrated devices, by making the layer V3 pass outside the corresponding first embossing unit 305, 307 or 421, 423 or 205, 207. In this way, the layer V3 remains smooth and is joined to the layer V1 at the positions of the protuberances P5, for example by means of a colored adhesive C, to obtain a better decorative effect.

It is to be understood that the drawing shows only an example provided solely as a practical demonstration of the invention, and that this invention may vary in its forms and arrangements without departure from the scope of the guiding concept of the invention. The presence of any reference numbers in the attached claims has the purpose of facilitating the reading of the claims with reference to the description and to the drawing, and does not limit the scope of protection represented by the claims.

The invention claimed is:

1. An embossed laminar product comprising at least two layers of web material wherein a first layer of said layers of web material has a background pattern made up of a first set of protuberances, on which is superimposed an ornamental motif made up of a second set of protuberances of major dimensions and minor density with respect to the first set of protuberances and to which said first layer is coupled a second layer of said layers of web material by means of adhesive; wherein said adhesive is applied in correspondence to said second set of protuberances, protuberances of said first set forming said background pattern being substantially free of adhesive, and wherein protuberances of said second set of protuberances which are superimposed on protuberances of said first set of protuberances substantially remove said protuberances of said first set of protuberances superimposed upon.

2. The product as claimed in claim 1, wherein said first layer and said second layer are adhered together by a colored adhesive.

3. The product as claimed in claim 1, wherein said second layer is embossed.

4. The product as claimed in claim 2, wherein said second layer is embossed.

5. The product as claimed in claim 1, 2, 3 or 4, wherein said second layer has an embossing comprising a third set of protuberances of major dimensions and minor density with respect to protuberances of said first set of protuberances.

6. The product as claimed in claim 5, wherein protuberances of the third set of protuberances on the second layer are inserted inside protuberances of said second set of protuberances on said first layer.

7. The product as claimed in claim 5, wherein protuberances of the third set of protuberances on the second layer are higher than protuberances of the second set of protuberances on the first layer.

8. The product as claimed in claim 5, wherein said first layer and said second layer are adhered together on at least some protuberances of the third set of protuberances on said second layer.

9. The product as claimed in claim 5, further comprising a third layer joined to the first layer and the second layer at protuberances of the second set of protuberances of said first layer.

10. The product as claimed in claim 9, wherein said third layer is embossed with a fourth set of protuberances arranged with a pattern common to a pattern of protuberances of the third set of protuberances on said second layer, but lower in height.

11. The product as claimed in claim 9, wherein said third layer is adhered to said first layer on at least some protuberances of said second set of protuberances.

12. The product as claimed in claim 10, wherein said third layer is adhered to said first layer on at least some protuberances of said second set of protuberances.

13. The product as claimed in claim 3, wherein said second layer comprises at least one background embossing including a plurality of third protuberances having minor dimensions and major density with respect to said ornamental motif.

14. The product as claimed in claim 13, wherein protuberances of each of said at least two layers of web material project from a surface of a corresponding layer facing an interior of the product.

15. The product as claimed in claim 13, wherein protuberances of the second set of protuberances of the first layer superimposed upon protuberances of said third set of protuberances in said second layer substantially remove the third protuberances superimposed upon, thereby forming said ornamental motif.

16. The product as claimed in claim 15, wherein protuberances forming said ornamental motif meet in the first layer, said second layer having protuberances on a surface facing opposite the first layer.

17. An embossed laminar product comprising at least two layers of web material wherein a first layer of said layers of web material has a background pattern made up of a first set of protuberances, on which is superimposed an ornamental motif made up of a second set of protuberances of major dimensions and minor density with respect to the first set of protuberances and to which said first layer is coupled a second layer of said layers of web material by means of adhesive; wherein said adhesive is applied in correspondence to said second set of protuberances, protuberances of said first set forming said background pattern being substantially free of adhesive; wherein said second layer has an embossing comprising a third set of protuberances of major dimensions and minor density with respect to protuberances of said first set of protuberances defining the background pattern on the first layer; and wherein protuberances of said second set of protuberances which are superimposed on protuberances of said first set of protuberances substantially remove said protuberances of said first set of protuberances superimposed upon.

18. An embossed laminar product comprising at least two layers of web material wherein a first layer of said layers of web material has a background pattern made up of a first set of protuberances, on which is superimposed an ornamental motif made up of a second set of protuberances of major dimensions and minor density with respect to the first set of protuberances and to which said first layer is coupled a second layer of said layers of web material by means of adhesive; wherein said adhesive is applied in correspondence to said second set of protuberances, protuberances of said first set forming said background pattern being substantially free of adhesive; wherein said second layer has an embossing comprising a third set of protuberances of major dimensions and minor density with respect to protuberances of said first set of protuberances defining the background pattern on the first layer; and wherein protuberances of the third set of protuberances on the second layer are inserted inside protuberances of said second set of protuberances on said first layer.

19. An embossed laminar product comprising at least two layers of web material wherein a first layer of said layers of web material has a background pattern made up of a first set of protuberances, on which is superimposed an ornamental motif made up of a second set of protuberances of major dimensions and minor density with respect to the first set of protuberances and to which said first layer is coupled a second layer of said layers of web material by means of adhesive; wherein said adhesive is applied in correspondence to said second set of protuberances, protuberances of said first set forming said background pattern being substantially free of adhesive; wherein said second layer has an embossing comprising a third set of protuberances of major dimensions and minor density with respect to protuberances of said first set of protuberances defining the background pattern on the first layer; and wherein protuberances of the third set of protuberances on the second layer are higher than protuberances of the second set of protuberances on the first layer.

20. An embossed laminar product comprising at least three layers of web material wherein a first layer of said layers of web material has a background pattern made up of a first set of protuberances, on which is superimposed an ornamental motif made up of a second set of protuberances of major dimensions and minor density with respect to the first set of protuberances and to which said first layer is coupled a second layer of said layers of web material by means of adhesive, and a third layer is joined to the first layer and the second layer at protuberances of the second set of protuberances of said first layer; wherein said adhesive is applied in correspondence to said second set of protuberances, protuberances of said first set forming said background pattern being substantially free of adhesive; wherein said second layer has an embossing comprising a third set of protuberances of major dimensions and minor density with respect to protuberances of said first set of protuberances defining the background pattern on the first layer; and wherein said third layer is embossed with a fourth set of protuberances arranged with a pattern common to a pattern of protuberances of the third set of protuberances on said second layer, but lower in height.

21. An embossed laminar product comprising at least two layers of web material wherein a first layer of said layers of web material has a background pattern made up of a first set of protuberances, on which is superimposed an ornamental motif made up of a second set of protuberances of major dimensions and minor density with respect to the first set of protuberances and to which said first layer is coupled a second layer of said layers of web material by means of adhesive; wherein said adhesive is applied in correspondence to said second set of protuberances, protuberances of said first set forming said background pattern being substantially free of adhesive; wherein said second layer is embossed and comprises at least one background embossing including a plurality of third protuberances having minor dimensions and major density with respect to said ornamental motif; and wherein protuberances of said third protuberances in said second layer which are superimposed on by protuberances of the second set of protuberances of the first layer are substantially removed by said protuberances of the second set of protuberances, thereby forming said ornamental motif.

22. The product as claimed in claim 21, wherein protuberances forming said ornamental motif meet in the first layer, said second layer having protuberances on a surface facing opposite the first layer.

* * * * *